(12) United States Patent  
Chan et al.

(10) Patent No.: US 6,639,329 B2  
(45) Date of Patent: Oct. 28, 2003

(54) ISOLATED POWER INPUT ARCHITECTURE

(75) Inventors: Johni Chan, Ranco Sante Fe, CA (US); Guy Thrap, Del Mar, CA (US)

(73) Assignee: I-Bus Corporation, San Jose, CA (US)

( * ) Notice: Subject to any disclaimer, the term of this patent is extended or adjusted under 35 U.S.C. 154(b) by 0 days.

(21) Appl. No.: 10/160,285

(22) Filed: May 31, 2002

(65) Prior Publication Data

US 2003/0090917 A1 May 15, 2003

Related U.S. Application Data

(63) Continuation-in-part of application No. 10/007,319, filed on Nov. 9, 2001.

(51) Int. Cl.[7] .............................. H02J 1/00; H02J 9/00
(52) U.S. Cl. ........................... 307/29; 307/39; 307/65
(58) Field of Search .......................... 307/19, 20, 23, 307/24, 28, 29, 31, 37, 38, 39, 44, 45, 51, 64, 65, 66; 363/65, 67, 69, 70, 71

(56) References Cited

U.S. PATENT DOCUMENTS 5,694,312 A * 12/1997 Brand et al. .............. 307/65 X
5,982,652 A * 11/1999 Simonelli et al. ......... 307/66 X
6,191,500 B1 * 2/2001 Toy .............................. 307/64

* cited by examiner

*Primary Examiner*—Jessica Han
(74) *Attorney, Agent, or Firm*—Thomas F. Lebens; Fitch, Even, Tabin & Flannery

(57) ABSTRACT

An isolated power input architecture that includes hot swappable input modules that are electrically isolated from each other so that each may provide input power to power supplies for an electronic device without adverse interactions between the voltages provided by each input module. The isolated input modules are each configured to lock the other out so that only one input module is providing power to the power supplies for the electronic device. The power supply for the electronic device preferably includes N+1 power supplies where N power supplies are required by the electronic device. Either of the isolated input modules provides enough power to supply power to all the N+1 power supplies.

20 Claims, 10 Drawing Sheets

ISOLATED POWER INPUT ARCHITECTURE

This patent document is a Continuation in Part of U.S. patent application Ser. No. 10/007,319, filed Nov. 9, 2001 for DUAL ISOLATED POWER SUPPLY INPUTS, which is incorporated herein by reference.

BACKGROUND OF THE INVENTION

1. Field of the Invention

The present invention relates generally to electric power supplies, and more specifically to redundant, automatic switching power supplies. Even more specifically, the present invention relates to inputs to redundant power supplies.

2. Discussion of the Related Art

For many critical or important electrical and/or electronic equipment or systems, it is desirable to have an alternate, or "standby," power source if a primary power source is lost or becomes unreliable.

A few examples of such equipment or systems are computer systems for hospital operating rooms and critical care equipment, air traffic control systems, police and fire emergency equipment, telecommunications systems, and national security systems. As may be imagined, the failure of a power supply to deliver a predictable power can have serious and potentially dangerous consequences.

It is, therefore, common to provide standby electrical power supplies to provide redundant power to a primary power supply. Commonly, the primary power is supplied by a local utility company at, e.g., 240 volts AC or 120 volts AC at 60 Hertz.

Many types of standby power sources are available, including turbines, micro-turbines, battery powered inverters, rotary engines, internal combustion engines, and more recently, high-speed electrical generators and flywheels have been developed. These standby power sources may vary from the primary power in terms of voltage, phase and frequency. Thus, the primary and standby power supplies may be unsynchronized, and if the primary and secondary supplies are applied to a load simultaneously, potentially harmful voltage spikes and current surges may occur.

To prevent interaction between primary and standby alternating current power sources some redundant power supplies have elaborate break-before-make switching to assure that sources of different voltages, phase and frequency do not get connected together.

In other applications, for example where a load operates from redundant direct current, some redundant power supplies connect the primary and standby supply inputs with diodes after each input has been full wave rectified. This type of configuration, however, does not eliminate the possibility of voltage multiplication if, for example, primary and standby sources are operating from different grounds.

SUMMARY OF THE INVENTION

The present invention advantageously addresses the needs above as well as other needs by providing a power input architecture for use with redundant power supplies.

In one embodiment, the invention can be characterized as a power input architecture for a computing system including a first input module comprising a second input module inhibitor and a first input module switch wherein the first input module is configured to receive power from a first power source wherein the first input module switch detachably couples the first input module to a power supply system for the computing system. The power input architecture also includes a second input module comprising a first input module inhibitor and a second input module switch wherein the second input module is configured to receive power from a second power source wherein the second input module switch detachably couples the second input module to the power supply system for the computing system. The first and second power input modules and the power supply system for the computing system are configured to be housed in a chassis of the computing system, and the second input module inhibitor is coupled to the second input module switch and is configured to provide a second input module inhibit signal wherein the second input module switch is configured to open in response to the second input module inhibit signal.

In another embodiment, the invention can be characterized as a method, and means for accomplishing the method, of providing input power to a computing system, the method including the steps of: receiving a first voltage from a first power source at a first input module wherein the first input module is detachably coupled to the computing system; communicating an inhibit signal from the first input module to a second input module in response to the first voltage from the first power source being at least a first predetermined voltage level; receiving a second voltage from a second power source at the second input module wherein the second input module is detachably coupled to the computing system; isolating the second voltage received at the second input module from the power supply system in response to the inhibit signal from the first input module being received at the second input module; providing power from the first power source to a power supply system for the computing system through the first input module in response to the first voltage from the first power source being at least the first predetermined voltage level; and providing power from the second power source to the power supply system for the computing system through the second input module in response to both the inhibit signal from the first input module not being received at the second input module and the second voltage being at least a second predetermined voltage level.

BRIEF DESCRIPTION OF THE DRAWINGS

The above and other aspects, features and advantages of the present invention will be more apparent from the following more particular description thereof, presented in conjunction with the following drawings wherein:

FIGS. 7, 7A, and 7B are a schematic diagram of the hardware making up one embodiment of a direct current input module that may be used as one or both of the two input modules of FIGS. 1, 2 and 3; and FIGS. 8, 8A, and 8B are a schematic diagram of the hardware making up one embodiment an input module of FIGS. 1, 2 and 3 that accepts alternating current.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

Figure 1:
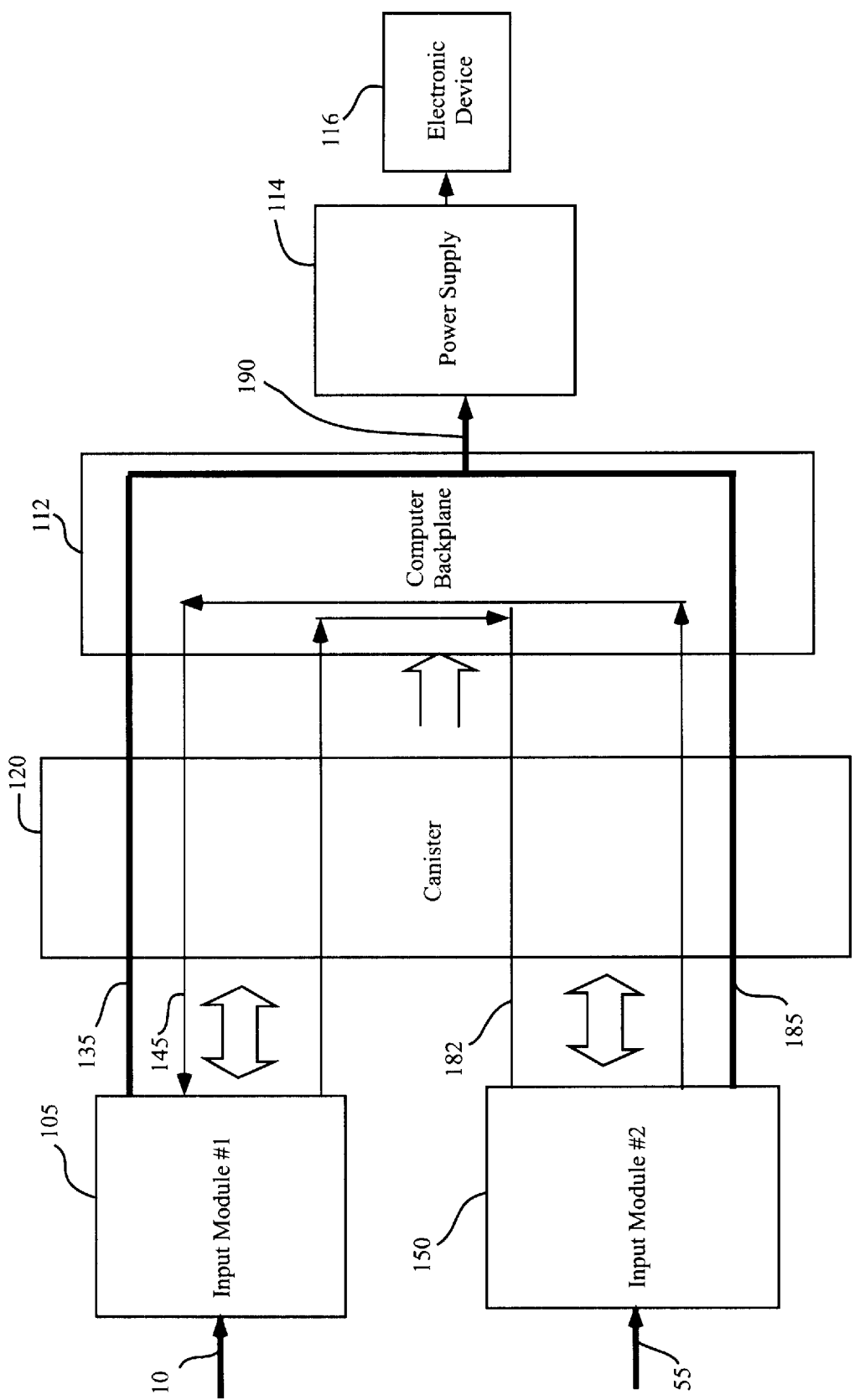
FIG. 1 is a block diagram of an overall architecture of one embodiment of a power input architecture in accordance with one embodiment of the invention.

Referring first to FIG. 1, shown is a block diagram of an overall architecture of one embodiment of a power input architecture in accordance with one embodiment of the invention.

Shown is a first input module 105 (also referred to as a first supply 105), a second input module 150 (also referred to as a second supply 150), a second input module inhibit line 182 (also referred to as a second supply inhibit line 182), a first module inhibit line 145 (also referred to as a first supply inhibit line 145), a support structure 120, a computer backplane 112, a first input module output line 135 (also referred to as a first supply output line 135), a second input module output line 185 (also referred to as a second supply output line 185), an output 190, power supplies 114 and an electronic device 116.

The first and second input modules 105, 150 are shown having a first power input 110 and a second power input 155 respectively. The first and second input modules 105, 150 are shown as independently removable modules that are configured to detachably couple to the support structure 120. The second input module inhibit line 182 feeds from the first input module 105 through the computer backplane 112 to an inhibit input line of the second input module 150. Similarly, the first input module inhibit line 145 feeds from the second input module 150 through the computer backplane 112 to an inhibit input line of the first input module 105. Also shown are a first input module output line 135 and a second input module output line 185 that couple the first input module 105 and second input module 150 (respectively) to the output 190 within the computer backplane 112. The computer backplane 112 is coupled to the power supplies 114 with the output 190 and the power supplies 114 are coupled to the electronic device 116.

Functionally, the first input module 105 and the second input module 150 provide redundant input sources of power to the power supplies 114 so that if one input module or its source of power should fail, the other input module is available to provide substantially uninterrupted power to the power supplies 114. This allows the power supplies 114 to continue to provide uninterrupted power to the electronic device 116.

Advantageously, in several embodiments, the first and second input modules 105, 150 are "hot swappable" so that either may be removed while actually supplying power to the power supplies 114 and the other remaining input module will take over and supply power to the power supplies 114. This allows replacement of either input module 105, 150 for purposes of repair, upgrades, and etc. without having to remove power from the power supplies 114.

The electronic device 116 in several embodiments is a computing system comprising several components, e.g., a central processing unit (CPU), magnetic and optical storage devices and other computer related electronic equipment. In accordance with the present embodiment, the computing system (or other electronic device) is housed in a housing, such as a rack mountable housing, along with the first and second input modules 105, 150. It is recognized that the electronic device 116 is not limited to electronic device is within a single housing, and thus the electronic device, in other embodiments, may include several electronic devices that are distributed over a substantial area.

The power supplies 114 are preferably a collection of power supplies equal to the number of power supplies required to power the electronic device 116 plus one. In other words, the power supplies 114 preferably comprise N+1 power supplies where N is the number of power supplies required to power the electronic device 116. In several embodiments, either of the first or second input modules 105, 150 is able to supply enough power to power all of the N+1 power supplies. For example, in one embodiment, the first and second input modules 105, 150 each provide 800 Watts of power when the N+1 power supplies require 600 Watts of power to power the electronic device 116, e.g., a computer system.

The first power input 110 and the second power input 155 may be either an alternating current ("A.C.") power source from, e.g., a local utility, a generator, and/or inverter or a direct current ("D.C.") power source such as batteries. Beneficially, the first power input 110 and the second power input 155 may be from power sources with different operating characteristics; as discussed further herein, the first power input 110 and the second power input 155 need not be synchronized, i.e., need not be in phase with on another, and may have different frequencies without adversely affecting the power provided to the power supplies 114.

Thus, the power input architecture of several embodiments comprises, hot swappable input modules that are individually capable of feeding enough power to supply N+1 power supplies. Furthermore, is some embodiments, the input modules are hot swappable, electrically isolated, alternating current input modules that are individually capable of feeding enough power to supply N+1 power supplies.

Figure 2:
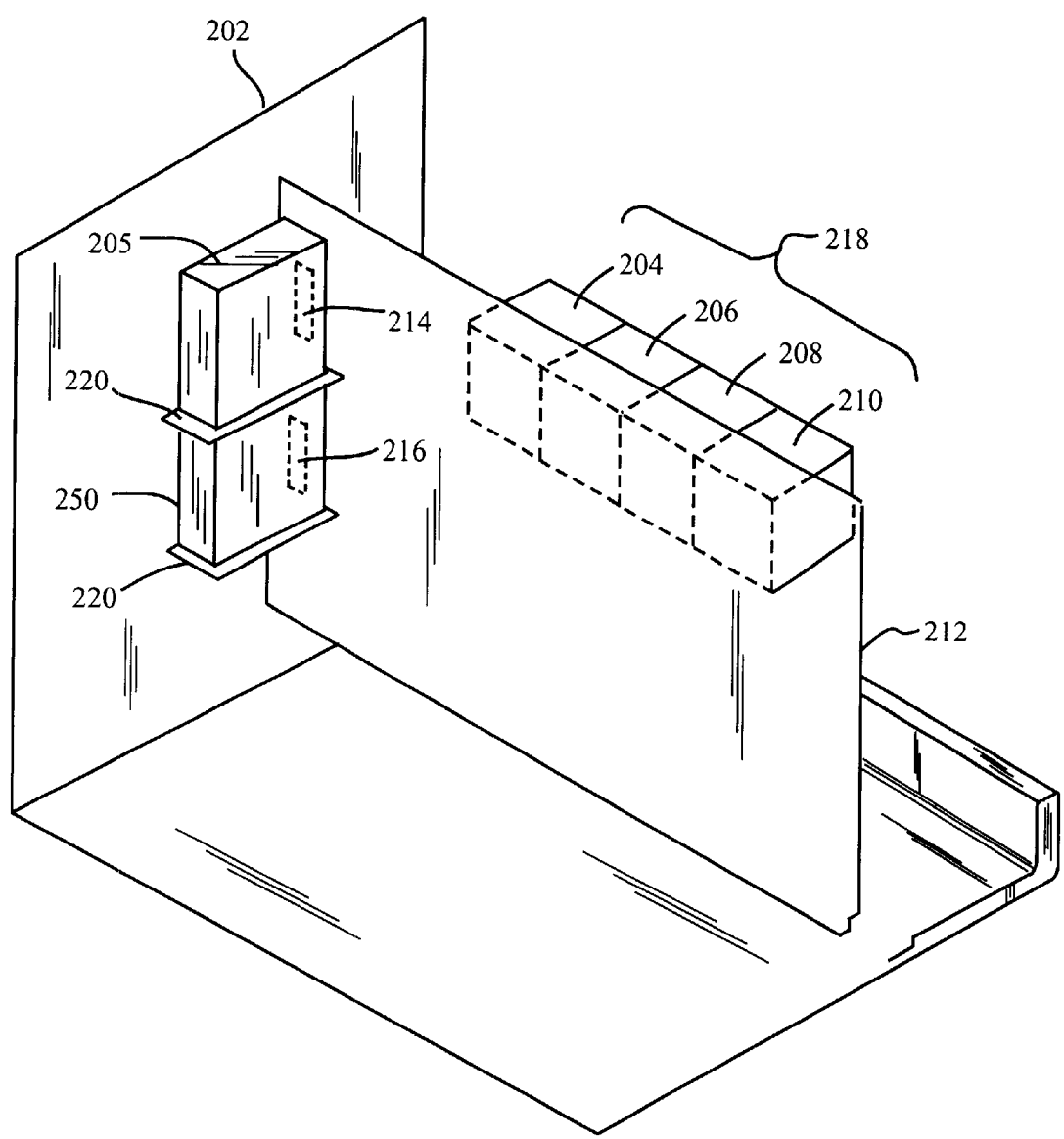
FIG. 2 is a perspective view of one embodiment of the power input architecture of FIG. 1.

Referring next to FIG. 2, shown is a perspective view of one embodiment of the input architecture of FIG. 1. Shown are a first input module 205 and a second input module 250 that are configured to fit within a primary receiving slot 214 and a secondary receiving slot 216 respectively on a computer backplane 212 that is within a chassis 202. The chassis 202 is typically inserted into a rack that supports components of a computer system. Also shown within the chassis 202 are a support structure 220 and a collection of four power supplies 204, 206, 208, 210 (collectively referred to as a power supply system 218) located on the opposite side of the computer backplane 212 from the input modules.

The present embodiment of the input power architecture advantageously has the first and second input modules 205, 250 and the collection of four power supplies 204, 206, 208, 210 located in a single chassis (the chassis 202). Thus, the present embodiment saves often needed rack space because input modules 205, 250 and power supplies 204, 206, 208, 210 are able to conveniently fit within one chassis instead of two or more.

In several embodiments, the support structure 220 is hard mounted to the chassis 202 to provide a support for the input modules 205, 250. The chassis 202, in several embodiments, is mounted in a rack (not shown) that supports the chassis 202 and other electronic devices, e.g., data storage units, etc.

Advantageously, the support structure 220 is designed to secure each of the input modules 205, 250 in place and yet allow the input modules 205, 250 to be readily removed from the chassis 202.

As shown, the support structure 220 are card guides that are affixed to a wall of the chassis 202. In this embodiment, the card guides help direct the input modules 205, 250 into place when being installed by a user, and helps support the input modules 205, 210 within the chassis once installed.

In another embodiment, the support structure 220 is a canister that is hard mounted within the chassis 202. The canister in this embodiment has receiving slots for the input modules 205, 250 that are designed to secure each of the input modules 205, 250 in place and yet, allow the input modules 205, 250 to be readily removed from the canister. Thus, once the canister 220 is installed in the chassis 202, the input modules 205, 250 may be more easily removed, exchanged, and/or replaced.

Preferably, of the collection of four power supplies 204, 206, 208, 210, only three power supplies are needed to provide power requirements of the electronic device 116, e.g., a network server system, so that if one should fail, the remaining three power supplies are able to provide sufficient power to, e.g., the network server system, without power interruption to the server system. In other words, the collection of four power supplies 204, 206, 208, 210 preferably comprises N+1 power supplies. It should be recognized that in other embodiments, there may be more or less than four power supplies depending upon power requirements of the particular computer system.

As with embodiments discussed with reference to FIG. 1, the input modules 205, 250, according to several embodiments, are hot swappable so that if, e.g., the first input module 205 is providing power from a first power source, e.g., line power from a utility, to the collection of power supplies 204, 206, 208, 210, the first input module 205 may be removed (along with the power from the first power source) without adversely affecting power levels provided to the collection of power supplies 204, 206, 208, 210. As discussed further herein, the power levels are maintained at the collection of power supplies 204, 206, 208, 210 because the second input module 250 automatically comes on line to carry power from a second power source, e.g., a battery backup, to the collection of power supplies 204, 206, 208, 210.

Additionally, in several embodiments, different types of input modules may be used in either the primary or secondary receiving slots 214, 216. For example, an input module that is designed to handle alternating current voltages between 95 and 265 VAC may be used in either receiving slot 214, 216 to receive power from an AC power source. Similarly an input module that is designed to receive direct current voltages between 40 and 68 VDC may be used in either receiving slot 214, 216. It should be recognized that input modules having different operating characteristics than those described above may be used, and the particular input module implemented may be selected to be compatible with the input voltage range of the power supplies 204, 206, 208, 210.

In several embodiments, the physical location of the input modules 205, 250 within the chassis 202 determines which input module is a preferred or default input module. For example, in one embodiment, the input module that is inserted within the primary receiving slot 214 becomes the default input module. The default input module will provide power to the collection of power supplies 204, 206, 208, 210 whenever there is an acceptable input voltage provided to the default input module. In other words, the default input module will not be locked out if it is receiving an acceptable input voltage. Thus, the first input module 205, and the second input module 210 may be identical, however, the first input module 214, in one embodiment, is the default input module that provides power to the collection of power supplies 204, 206, 208, 210 by virtue of being in the primary receiving slot 214.

Figure 3:
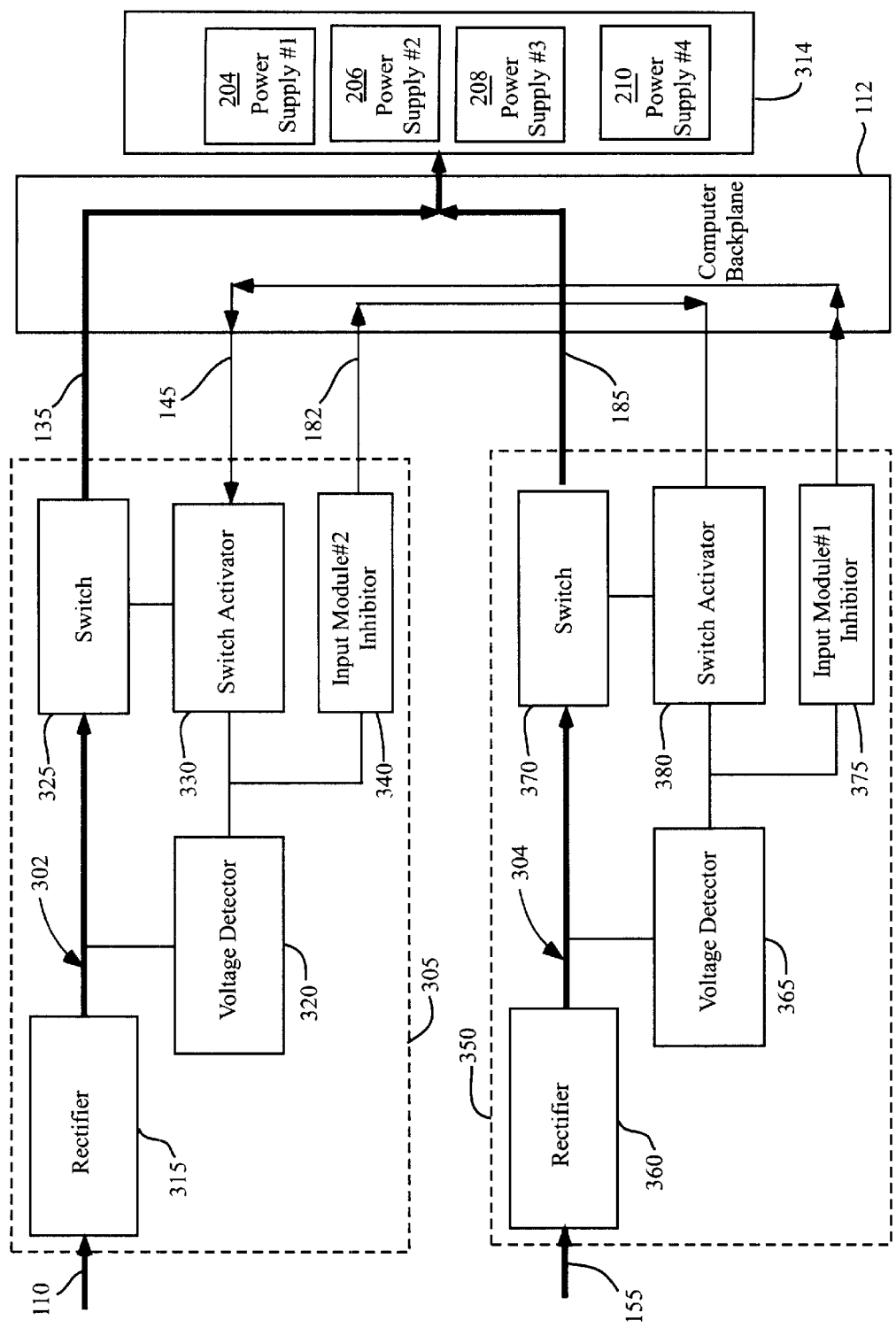
FIG. 3 is a functional block diagram of one embodiment of first and second input modules of the isolated power input architecture of FIGS. 1 and 2.

Referring next to FIG. 3, shown is a functional block diagram of one embodiment of first and second input modules of the isolated power input architecture of FIGS. 1 and 2. Shown are the first power input 110 feeding a first input module 305 and the second power input 155 feeding a second input module 350. Shown within the first input module 305 are a first input module rectifier 315 (also referred to as a first supply rectifier 315), a first rectified voltage 302, a first input module voltage detector 320 (also referred to as a first supply voltage detector 320), a first input module switch 325 (also referred to as a first supply switch 325), a first input switch actuator 330 (also referred to as a first supply switch actuator 330), the first input module output line 135, and a second input module inhibitor 340 (also referred to as a second supply inhibitor 340). Shown within the second input module 350 are a first input module inhibit line 145 (also referred to as a first supply inhibit line 145), a second input module rectifier 360 (also referred to as a second supply rectifier 360), a second rectified voltage 304, a second input module voltage detector 365 (also referred to as a second supply voltage detector 365), a second input module switch 370 (also referred to as a second supply switch 370), a first input module inhibitor 375 (also referred to as a first supply inhibitor 375), a second input module switch actuator 380 (also referred to as a second supply switch actuator 380), and the second input module output line 185. Additionally shown are the computer backplane 112, the output 190, and an N+1 power supply 314 that comprises the individual power supplies 204, 206, 208, 210.

While referring to FIG. 3, concurrent reference will be made to FIG. 4, which is a schematic diagram of hardware making up one embodiment of the input modules of FIGS. 1, 2 and 3.

The first input module 305 and the second input module 350 each serve as an input to the N+1 power supply 314 wherein, at any given time, only one of the first and second input modules 305, 350 feeds power from their respective first or second input 110, 155 to the output 190. In turn, the output 190 feeds the power from the only one of the first or second input modules 305, 350 to the N+1 power supply 314. Thus, the first input module 305 and the second input module 350 collectively are dual inputs to the N+1 power supply 314 that are, as discussed herein, electrically isolated from one another.

Figure 4:
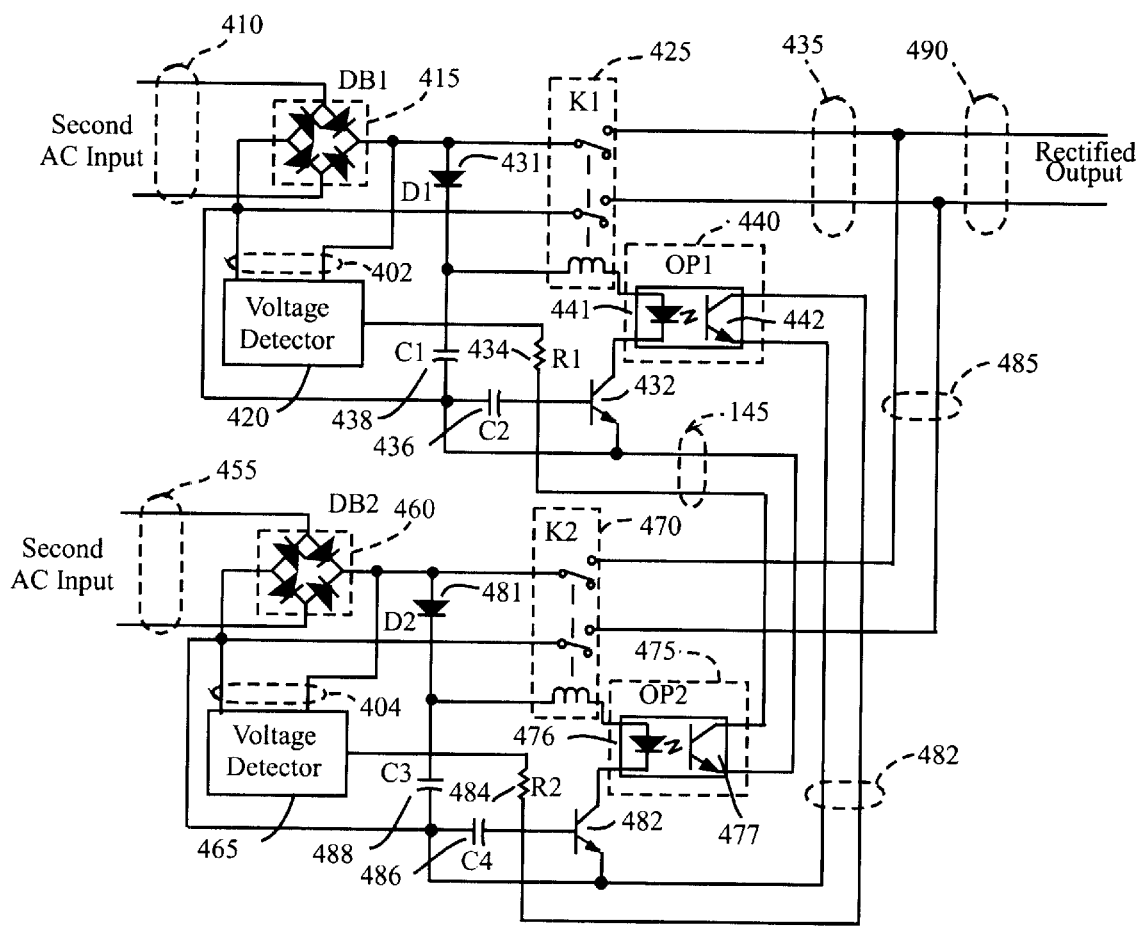
FIG. 4 is a schematic diagram of hardware making up one embodiment of the input modules of FIGS. 1, 2 and 3.

Referring to FIGS. 3 and 4, the first power input 110, 410 and the second power input 155, 455 feed into the first input module rectifier 315 and the second input module rectifier 360 respectively. The first input module rectifier 315 and the second input module rectifier 360 operate to convert the voltage from the first power input 110 and the second power input 155 into a first rectified voltage 302 and a second rectified voltage 304 respectively. The first and second rectified voltages 302, 304 more closely resemble a direct current ("D.C.") voltage, i.e., a voltage that does not change polarity as does A.C. voltage. The first input module rectifier 315 and the second input module rectifier 360 may be a first full-wave bridge rectifier 415 and a second full-wave bridge rectifier 460 respectively which convert a typical A.C.

sine-wave into the first and second rectified voltages 302, 304 that typically have "ripple", i.e., periodic variations in voltage about a steady value. It should be recognized that the rectified voltages 302, 304 are not limited to voltages that have been rectified by a bridge rectifier that the input modules 305, 350 in several embodiments do not need a rectifier because one or both of the first and second power inputs 110, 155 may already be a direct current power input.

The output 190, 490 is intended to drive the N+1 power supplies 314 which are preferably power factor corrected power supplies that operate equally well from voltages of AC, rectified AC or DC.

The first rectified voltage 302, 402 and second rectified voltage 304, 404 are provided by electrical coupling to the first input module voltage detector 320, 420 and the second input module voltage detector 365, 465 respectively. The first input module voltage detector 320, 420 and the second input module voltage detector 365, 465 function to sense voltage levels of the first rectified voltage 302, 402 and the second rectified voltages 304, 404 at the outputs of the first input module rectifier 315, 415 and the second input module rectifier 360, 460 respectively. As discussed further herein and in reference to FIG. 5, the first input module voltage detector 320, 420 and the second input module voltage detector 365, 465 provide, as an output, a first voltage confirmation signal and a second voltage confirmation signal respectively in response to the first rectified voltage 302, 402 and the second rectified voltage 304, 404 being within a predetermined voltage window. As is known in the art, the first input module voltage detector 320, 420 and the second input module voltage detector 365, 465 are tunable so that the predetermined voltage window may be adjusted to the requirements of the N+1 power supply 314 that is driven from the output 190, 490. This predetermined voltage window for an AC input module would typically be 90 to 265 volts AC referred to the first and second power inputs, 110 and 155. For a DC input module, the predetermined voltage window is typically 40 to 68 VDC.

The output of the first input module voltage detector 320 is electrically coupled to the first input module switch actuator 330 and the second input module inhibitor 340. The output of the second input module voltage detector 365 is electrically coupled to the second input module switch actuator 380 and the first input module inhibitor 375. The first input module switch actuator 330 is electrically coupled via the first supply inhibit line 145 to the first input module inhibitor 375, and the second input module switch actuator 380 is electrically coupled via the second supply inhibit line 182 to the second input module inhibitor 340.

Figure 5:
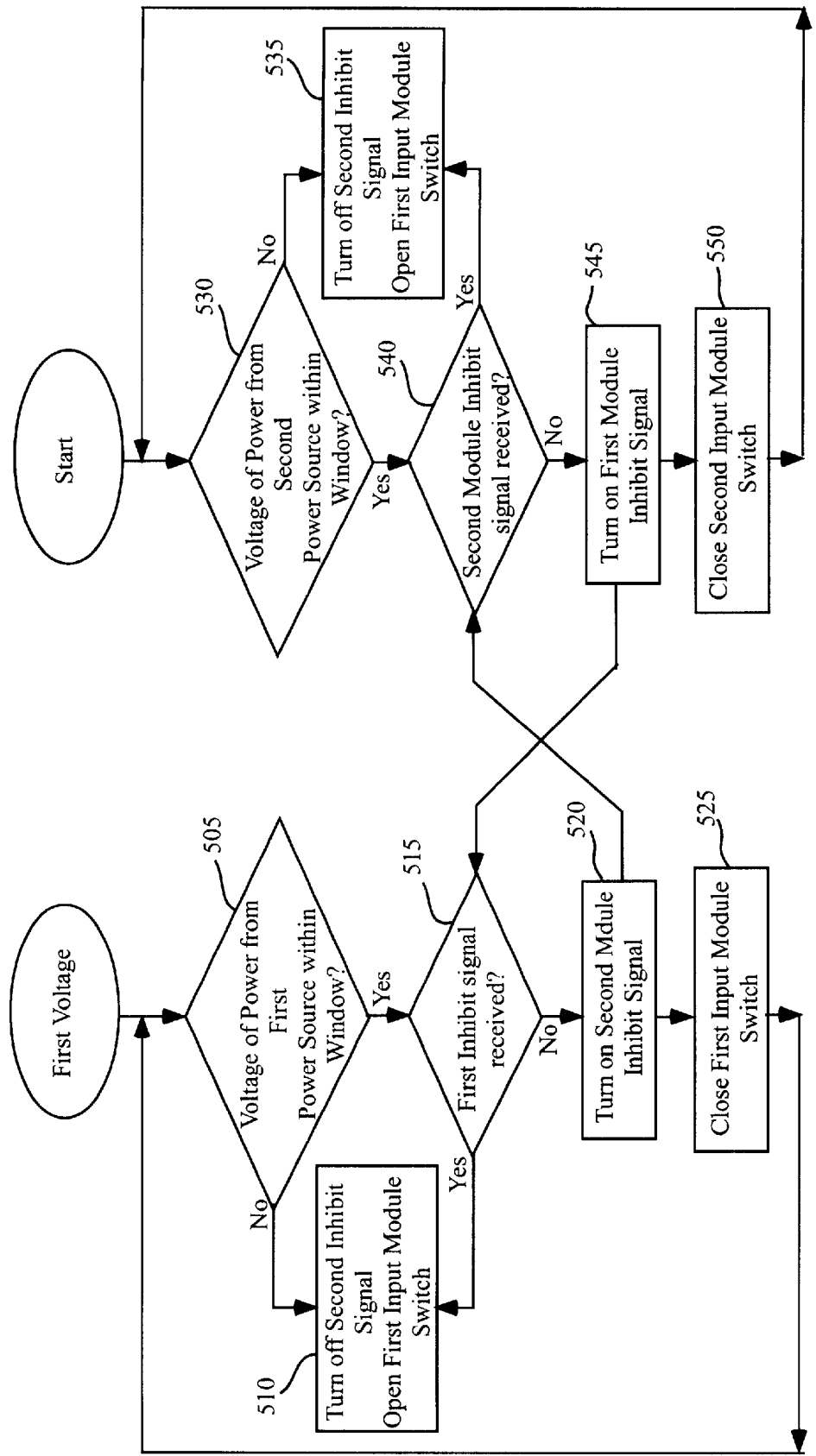
FIG. 5 is a flow chart describing the steps traversed by the first and second input modules of FIGS. 1, 2 and 3 to achieve toggle switching between the first and second input modules.

As discussed further herein and in reference to FIG. 5, the first input module voltage detector 320, first input module switch actuator 330 and the second input module inhibitor 340 function to provide the first rectified voltage 302 to the output 190 while providing a second input module inhibit signal (also referred to as a second supply inhibit signal) from the second input module inhibitor 340 to the second input module 350. The second input module inhibit signal from the second input module inhibitor 340 prevents the second input module 350 from providing power to the output 190 when the first rectified voltage of the first input module 305 is within the predetermined voltage window.

Similarly, as discussed further herein and with reference to FIG. 5, in several embodiments, in the absence of the second input module inhibit signal from the second input module inhibitor 340, the second input module voltage detector 365, second input module switch actuator 380 and the first input module inhibitor 375 function to provide the second rectified voltage 304 to the output 190. In some embodiments, e.g., where neither of the input modules 305, 350 is a default input module, the second input module 350 will inhibit the first input module 305 from coming on-line by providing a first input module inhibit signal (also referred to as a first supply inhibit signal) from the first input module inhibitor 375 to the first input module switch actuator 330 to prevent the first input module 305 from providing power to the output 190.

In other embodiments, the first input module 305 is a default input module that will feed power from the first power input 110 to the output 190 whenever the first rectified voltage 302 is within the predetermined voltage window. In these embodiments, the second input module 350 does not lock out the first input module 305, allowing the first input module to come back on-line anytime the first rectified voltage 302 returns to a voltage within the predetermined voltage window.

In some embodiments, when the first input module 305 is the default input module, the second input module 350 is prevented from locking out the first input module 305 because the first input module inhibit line 145 is not connected to the first input module 305. Such a configuration prevents inhibit signals from the second input module 350 from reaching the first input module switch actuator 330, and thus, the first input module 305 cannot be locked out by the second input module 350.

In practice, the first input module switch actuator 330, closes the first input module switch 325 when the second input module 350 is off line, i.e., is not providing power to the output 190 and when the first rectified voltage 302 is within the predetermined voltage window. In the present embodiment, the first input module switch actuator 330 provides power, in response to the first voltage confirmation signal from the first input module voltage detector 320 and an absence of the first input module inhibit signal from the first input module inhibitor 375, to close the first input module switch 325 so that the first rectified voltage 302 of the first input module rectifier 315 is provided directly to the output 190 via the first input module output line 135.

Similarly, the second input module switch actuator 380 closes the second input module switch 370 when both the first input module 305 is off line, i.e., is not providing power to the output 190, and the second rectified voltage 304 is within the predetermined voltage window. As shown, the second input module switch actuator 380 provides power, in response to the second voltage confirmation signal from the second input module voltage detector 365 and an absence of the second input module inhibit signal from the second input module inhibitor 340, to close the second input module switch 370 so that the second rectified voltage 304 of the second input module rectifier 360 is provided directly to the output 190 via the second supply output line 185.

As shown in FIG. 3 and FIG. 4, in one embodiment, the first input module switch 325 and the second input module switch 370 may be a first electromechanical switch 425 and a second electromechanical switch 470 respectively. The first electromechanical switch 425 and a second electromechanical switch 470 may be relay switches that are readily available and well known to one of ordinary skill in the art. In other embodiments, the first input module switch 325 and the second input module switch 370 may be solid state switches which are also readily available and well known to one of ordinary skill in the art.

The first input module switch actuator 330 may be a combination of circuit elements that include a first switching transistor 432, a first timing resistor 434 a first timing capacitor 436, a first diode 431, and a first power capacitor 438. Assuming the first input module 305 is configured to receive power from the first power input 110 before the second input module 350 receives power from the second power input 155, the first voltage detector 420, in response to a first rectified voltage 402 at the output of the first supply rectifier 415 being within a predetermined voltage window, drives the first switching transistor 432 through a time delay formed by the first timing resister 434 and the first timing capacitor 436; thus turning on the first switching transistor 432. The first diode 431 and the first power capacitor 438 form a DC power supply so that when the first switching transistor 432 is turned on, the DC power supply formed by the first diode 431 and the first power capacitor 438 drives a coil in the first electromechanical switch 425 which, in turn, closes the first electromechanical switch 425. As a result, a rectified voltage 402 from the first full-wave bridge rectifier 415 is applied to the rectified output 490.

Similarly, the second input module switch actuator 380 may be a combination of circuit elements that include a second switching transistor 482, a second timing resistor 484 a second timing capacitor 486, a second diode 481, and a second power capacitor 488. As configured in FIG. 4, when the first electromechanical switch 425 is open, i.e., when the first input module 305 is no longer supplying power to the output 190, the second voltage detector 465, in response to the second rectified voltage 404 at the output of the second supply rectifier 460 being within the predetermined voltage window, turns on the second switching transistor 482 by driving the second switching transistor 482 through a time delay formed by the second timing resistor 484 and the second timing capacitor 486. The second diode 481 and the second power capacitor 288 form a second DC power supply so that when the second switching transistor 482 is turned on, the second DC power supply formed by the second diode 481 and the second power capacitor 488 drives a coil in the second electromechanical switch 470 which, in turn, closes the second electromechanical switch 470 and the second rectified voltage 404 from the second full-wave bridge rectifier 460 is applied to the rectified output 490.

Referring back to FIG. 3, the second input module inhibitor 340, functions to prevent the second input module 350 from applying a voltage to the output 190 when the first input module 305 is providing a voltage within the predetermined voltage window. Similarly, the first input module inhibitor 375 functions to prevent the first input module 305 from applying a voltage to the output 190 when the second input module 350 is providing voltage to the output 190.

As shown in FIG. 3, the second input module inhibitor 340 is communicatively coupled to the second input module switch actuator 380. When the second input module inhibitor 340 receives the first voltage confirmation signal from the first input module voltage detector 320, indicating the first rectified voltage 302 is within the predetermined voltage window, the second input module inhibitor 340 provides the second input module inhibit signal to the second input module switch actuator 380 via the second input module inhibit line 182. The second input module switch actuator 380, in response to the second input module inhibit signal, will not activate, i.e., will not close, the second input module switch 370, even if the second rectified voltage 304 is within the predetermined voltage window. In other words, the second input module switch actuator 380, when receiving the second input module inhibit signal, will not allow the second rectified voltage 304 through to the output 190 even though the second input module switch actuator 380 is receiving a second voltage confirmation signal from the voltage detector 365.

In several embodiments, when the first input module inhibitor 375 receives the second voltage confirmation signal from the second input module voltage detector 365, indicating the second rectified voltage 304 is within the predetermined voltage window, the first input module inhibitor 375 provides the first input module inhibit signal to the first input module switch actuator 330 via the first input module inhibit line 145. The first input module switch actuator 330, in response to the first input module inhibit signal, will not activate, i.e., will not close, the first input module switch 325 even if the first rectified voltage 302 at the output of the first input module rectifier 315 is within the predetermined voltage window. Therefore, a toggle-type switching scheme is achievable in which the first input module switch 325 will not close while the second input module switch 370 is closed, and the second input module switch 370 will not close while the first input module switch 325 is closed.

As a result, only one of the first input module 305 and second input module 350 is providing a voltage to the output 190 at any given time, and potentially harmful effects of voltage from the first input module 305 being multiplied by voltage from the second input module 350 are mitigated.

As shown in FIGS. 3 and 4, the second input module inhibitor 340 and the first input module inhibitor 375 may be a first opto-coupler 440 and a second opto-coupler 475 respectively. The first opto-coupler 440 and the second opto-coupler 475 are effectively high impedance insulators that communicatively couple the first input module 305 and the second input module 350. In several embodiments, the first and second opto-couplers 440 and 475 prevent electrical interaction, e.g. voltage multiplication or current flow, between the first input module 305 and the second input module 350. Thus, the first opto-coupler 440 allows the first input module 305 to control, e.g., inhibit, the second input module 350 while maintaining electrical isolation between the first input module 305 and the second input module 350. Similarly, the second opto-coupler 475 allows the second input module 350 to control, e.g., inhibit, the first input module 305 while maintaining electrical isolation between the first input module 305 and the second input module 350.

It should be recognized that in several embodiments, the input modules 305, 350 are DC input modules. In some of these embodiments, the first and second input modules 305, 350 share a common zero volt line, and thus, the first and second input modules 305, 350 are not galvanically isolated from each other. The switching configurations described throughout this document, however, isolate the voltages of the first and second power inputs 110, 155 from the output 190 so that only one of the first and second power inputs 110, 155 provides power to the power supply system 114, 218, 314 at a time.

It should also be recognized that, in several of the embodiments where DC input modules are utilized, the first and second rectified voltages 302, 304 are direct current voltages that were not rectified by either of the first or second input modules 305, 350. Thus, in several embodiments, the first and second rectified voltages 302, 304 are merely direct current voltages received from the first and second power inputs 110, 155.

As shown, a first light emitting diode ("LED") 441 of the first opto-coupler 440 is in series with the first coil of the first electromechanical switch 425, and a second LED emitter 476 of the second opto-coupler 475 is in series with a second coil of the second electromechanical switch 470. As a result, when the first voltage detector 420 is providing a first voltage confirmation signal, which turns on the first switching transistor 432, the first electromechanical switch 425 is closed and the LED emitter 441 of the first opto-coupler 440 is illuminated; thus turning on a phototransistor 442 of the first opto-coupler 440. When the phototransistor 442 of the first opto-coupler 440 is turned on, the second switching transistor 482 is either maintained off or turned off; thus, preventing the second electromechanical switch 470 from closing.

Similarly, in the second input module 350, when the second voltage detector 465 is providing a second voltage confirmation signal that turns on the second switching transistor 482, the second electromechanical switch 470 is closed and a second LED emitter 476 of the second opto-coupler 475 is driven so that a second phototransistor 477 of the second opto-coupler 475 is turned on. When the second phototransistor 477 of the second opto-coupler 475 is turned on, the first switching transistor 432 is turned off; thus, preventing the first electromechanical switch 425 from closing.

Thus, a means of switching between the first and second power inputs 110, 155 to the power supply system 114, 218, 314 is provided wherein the first power input 110 is isolated from the second power input 155 so that each power input may be out of phase with one another, have a different voltage and a different frequency without the adverse effects, e.g., potentially damaging voltage multiplication, present in diode isolated dual input power supply systems. As discussed, in several embodiments, the input modules 305, 350 are DC input modules that share a common zero volt reference line, and thus, the input modules in these embodiments are not galvanically isolated from each other. In such embodiments, however, the means of switching between the first and second input modules 305, 350 disclosed herein isolates the first and second power inputs 110, 155 from the output 190 by opening switches 325 and 370 respectively.

Referring next to FIG. 5, shown is a flow chart describing the steps traversed by the input modules of FIGS. 1, 2 and 3 to provide toggle-type switching between the first input module 105, 205, 305 and the second input module 150, 250, 350.

When a toggle-type switching configuration is employed, initially, either the first input module 105, 205, 305 or the second input module 150, 250, 350 will start first and lock out the other input module. Within the toggle-type switching configuration, an input module that is "on-line" will continue to provide power until a rectified voltage, (e.g., the first or second rectified voltage 302, 304) of the input module that is on-line falls outside the predetermined voltage window. When the rectified voltage of the input module that is on-line leaves the predetermined voltage window (e.g., the rectified voltage rises above or falls below the predetermined voltage window), the other input module will take over until the rectified voltage of the other input module leaves the predetermined voltage window. Thus, in several embodiments the input module architecture is configured to toggle between the first input module 105, 205, 305 and the second input module 150, 250, 350 without having either input module as a preferred input module that overrides the other. Assuming that the first supply 105, 205, 305 starts up before the second supply 150, 250, 350 the first voltage detector 320 monitors the first rectified voltage 302 at the output of the first supply rectifier 315 to determine if the first rectified voltage 302 falls within the predetermined voltage window (Step 505).

If the first rectified voltage 302 is within the predetermined voltage window, the first input module switch 325 is closed (Step 525), and the second input module inhibitor 340 prevents the second input module 150, 250, 350 from coming "on line", i.e., providing power to the output 190, by inhibiting, as discussed above, the second input switch actuator 380 from activating, i.e., from closing, the second input module switch 370 (Step 520).

If the first rectified voltage 302 is outside the predetermined voltage window, the first input module voltage detector 320 does not provide a first voltage confirmation signal, and the first input module switch actuator 330 maintains the first input module switch 325 in an open position so that the first input module rectifier 315 is electrically disconnected from the output 190 (Step 510). Additionally, the second input module inhibitor 340 remains inactive so that it does not inhibit the second input module switch actuator 380 from activating, i.e., closing, the second input module switch 370.

During the steps mentioned above, the second input voltage detector 365 is continuously monitoring the output of the second input rectifier 360, i.e., the second input voltage detector 365 is continuously monitoring the second rectified voltage 304 (Step 530).

If the second rectified voltage 304 is outside the predetermined voltage window, the second input voltage detector 365 will not provide the second voltage confirmation signal to the second input switch actuator 380 so that the second input switch actuator 380 continues to maintain the second input switch 370 in a open position; thus isolating the second input rectifier 360 from the output 190 (Step 535). Additionally, the first input module inhibitor 375 remains inactive so that the first input module 105, 205, 305 is not inhibited; thus allowing the first input module 105, 205, 305 to come back on line (Step 525).

If the second rectified voltage 304 is within the predetermined voltage window, the second input module voltage detector 365 provides a second voltage confirmation signal that activates the first input module inhibitor 375 so that the first input module inhibit signal prevents the first input module switch actuator 330 from closing the first input module switch 325; thus preventing the first input module 105, 205, 305 from coming back online even though the first input module rectifier 315 once again provides the first rectified voltage 302 within the predetermined voltage window (Step 545).

Additionally, the second input module switch actuator 380, in response to the second voltage confirmation signal from the second input module voltage detector 365, closes the second input module switch 370; thus providing the second rectified voltage 304 from the output of the second input module rectifier 360 to the output 190, i.e., placing the second input module 150, 250, 350 on line (Step 550).

As long as the second input module rectifier 360 continues to supply the second rectified voltage 304 that is within the predetermined voltage level, the first input module inhibitor 375 continues to maintain the first supply inhibit signal so as to prevent the first input module 105 from coming on line regardless of the performance of the first input module 105 (Step 515). In other words, as long as the second input module 150 continues to provide a second rectified voltage 304 that is within the predetermined voltage window, the first input module 105 is disabled.

If, however, the second rectified voltage 304 from the second input rectifier 360 deviates from the predetermined voltage window, and the first rectified voltage 302 from the first input module 105 is detected by the first input module voltage detector 320 to be within the predetermined voltage window (Step 505), the first input module switch actuator 330 is activated; thus closing the first input module switch 325 which brings the first input module 105 on line (Step 525). Additionally, the second input module inhibitor 340 is activated; thus disabling the second input module 150 (Step 520).

Figure 6:
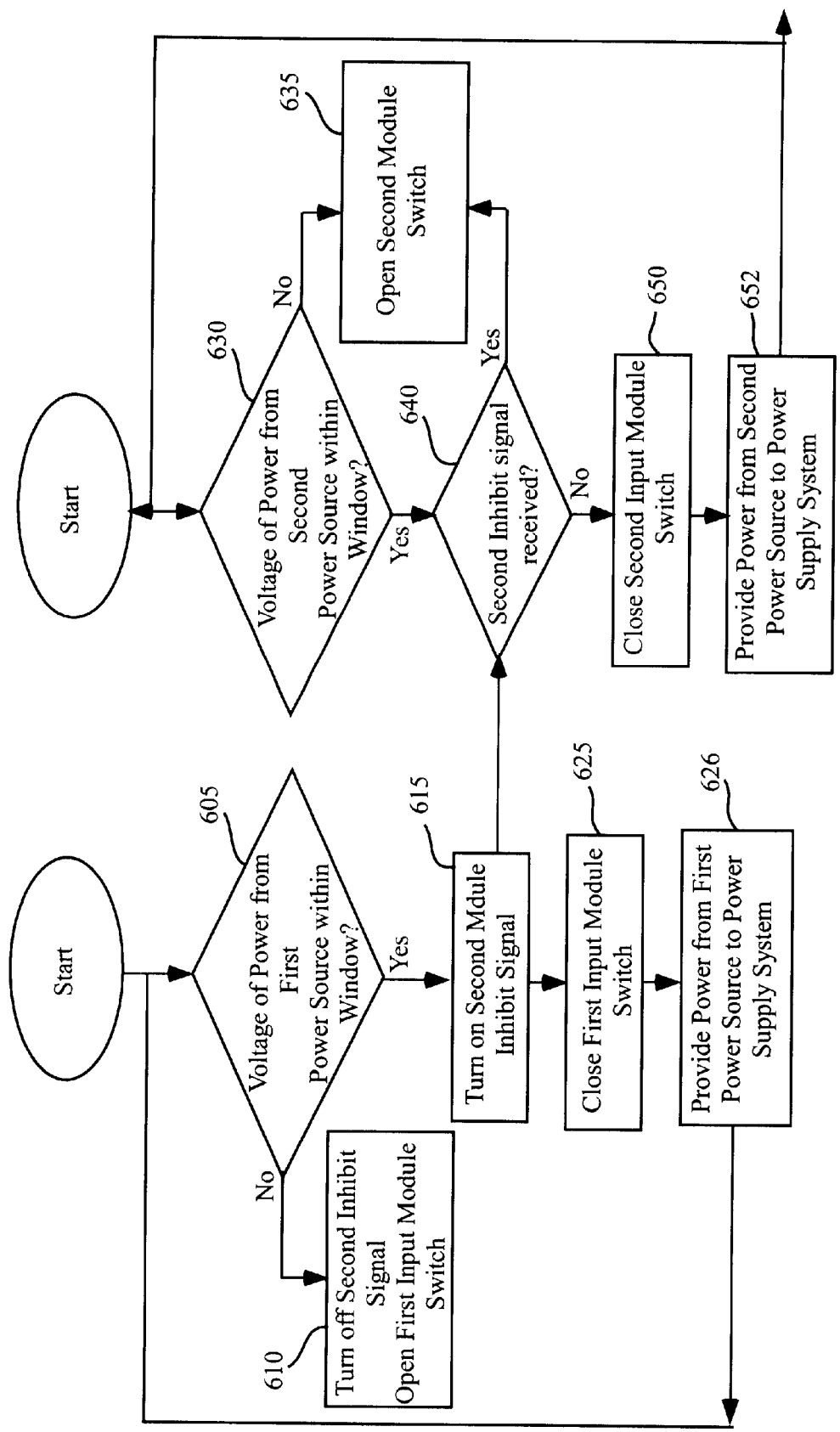
FIG. 6 is a flow chart describing the steps traversed by the first and second input modules of FIGS. 1, 2 and 3 to achieve default switching to a first input module.

Referring next to FIG. 6, shown is a flow chart describing the steps traversed by the input modules of FIGS. 1, 2 and 3 to provide "default-type" switching between the first input module 105, 205, 305 and the second input module 150, 250, 350. As described further herein, default-type switching is a switching scheme in which one of the input modules is selected to be a default input module that feeds power from one of the power inputs 110, 155 to the power supplies 114, 218, 314. In several embodiments, the default-type switching scheme defaults to the default input module whenever a rectified voltage (e.g., the first or second rectified voltages 302, 304) of the default input module is within the predetermined voltage window.

In several embodiments, the first input module 105, 205, 305 is a default module that, upon receiving input power having a voltage within a predetermined voltage window (Step 605), locks out the second input module 150, 250, 350 with a second input module inhibit signal (Step 615), and closes the first input module switch 625. Thus, the second input module inhibitor 340 prevents the second input module 150, 250, 350 from coming "on line", i.e., providing power to the output 190, by inhibiting, as discussed above, the second input module switch actuator 380 from activating, i.e., from closing, the second input module switch 370.

It should be noted that either the first input module 105, 205, 305 or the second input module 150, 250, 350 may be the default input module. As discussed with reference to FIG. 2, a particular slot on the computer backplane 112 may determine which input module is the default input module.

If the first rectified voltage 302 is outside the predetermined voltage window, the first input module voltage detector 320 does not provide a first voltage confirmation signal, and the first input module switch actuator 330 maintains the first input module switch 325 in an open position so that the first input module rectifier 315 is isolated, i.e., electrically disconnected, from the output 190. Additionally, the second input module inhibitor 340 removes the second input module inhibit signal so that it does not inhibit the second input module switch actuator 380 from activating, i.e., closing, the second input module switch 370 (Step 610).

During the steps mentioned above, the second input module voltage detector 365 is continuously monitoring the output of the second input module rectifier 360, i.e., the second input module voltage detector 365 is continuously monitoring the second rectified voltage 304 (Step 630).

If the second rectified voltage 304 is outside the predetermined voltage window, the second input module voltage detector 365 will not provide the second voltage confirmation signal to the second input module switch actuator 380 so that the second input module switch actuator 380 continues to maintain the second input module switch 370 in a open position; thus isolating the second input module rectifier 360 from the output 190 (Step 635). Additionally, because the first input module 105, 205, 305 is the default input module, the first input module inhibitor 375 remains inactive so that the first input module 105, 205, 305 is not inhibited; thus allowing the first input module 105, 205, 305 to come back on line (Step 625).

If the second rectified voltage 304 is within the predetermined voltage window, the second input switch actuator 380, in response to the second voltage confirmation signal from the second input module voltage detector 365, closes the second input module switch 370; thus providing the second rectified voltage 304 from the output of the second input module rectifier 360 to the output 190, i.e., placing the second input module 150, 250, 350 on line (Step 650).

The second input module 150, 250, 350 will continue to channel power from a second power source received at the second power input 155 to the power supplies 114 until either the second rectified voltage 304 received by the voltage detector 365 is outside the predetermined voltage window (Step 630) or until the second input module inhibit signal is received by the switch activator 380 (Step 640) at which time the second input module switch 325 will open; thus disconnecting the second power source from the power supplies 114, 218, 314.

Figure 7A:
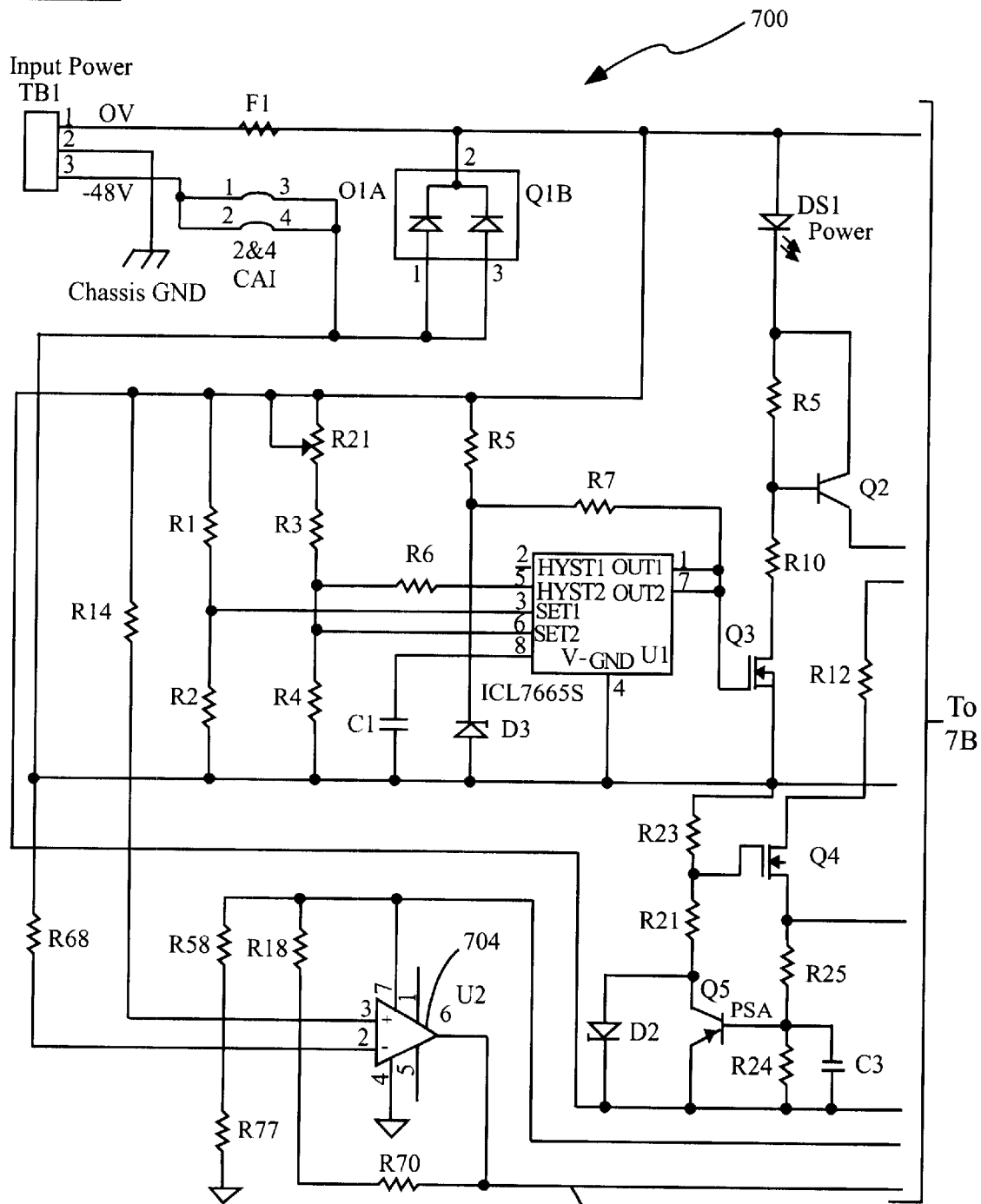
Figure 7B:
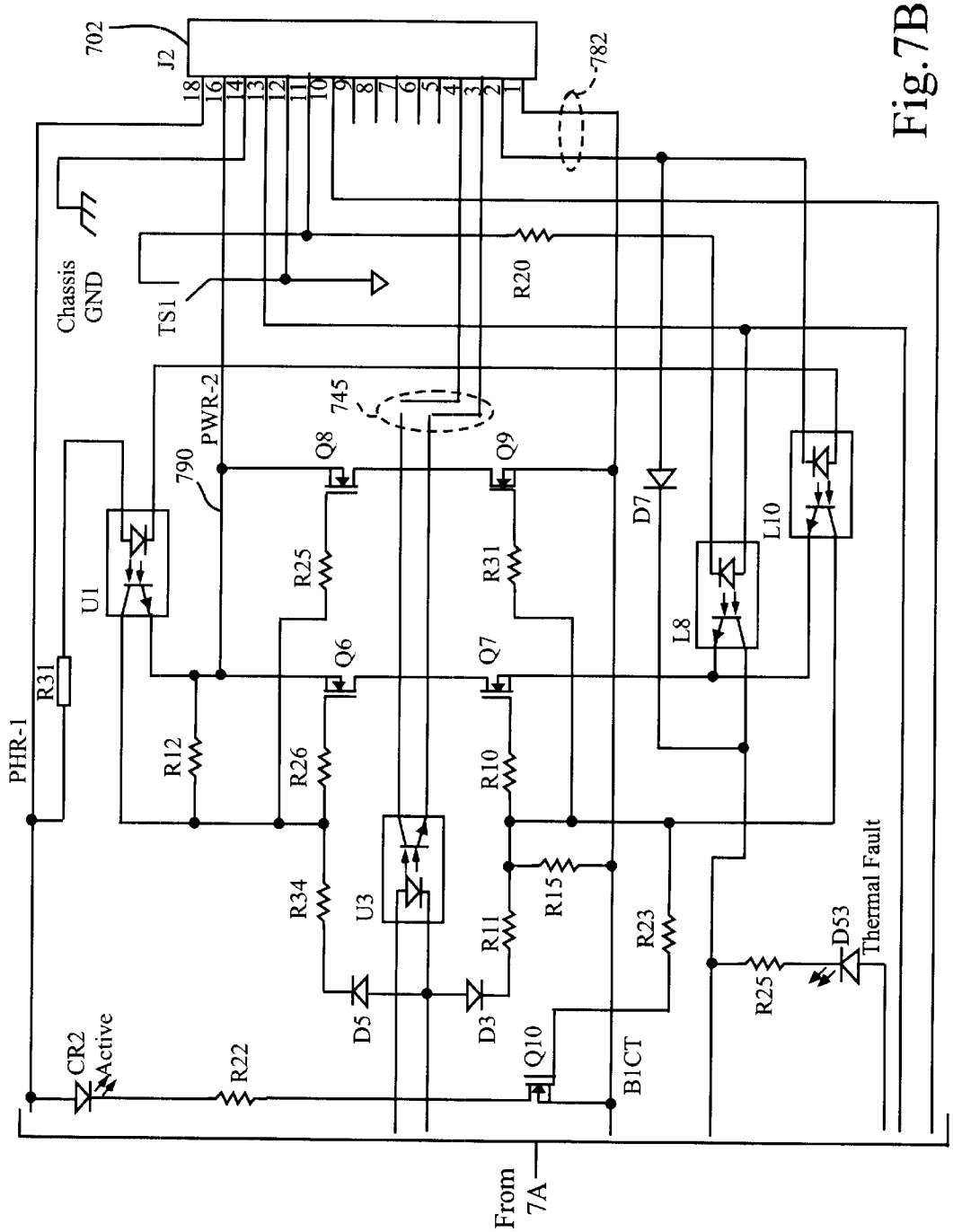

Referring next to FIG. 7, shown is a schematic diagram of the hardware making up one embodiment of a direct current input module that may be used as one or both of the two input modules of FIGS. 1, 2 and 3.

In this embodiment, a DC input module 700 is shown that is configured to receive input voltages between 40 and 68 VDC and provide an output voltage at an output line 790 that is between 40 and 68 VDC. In this embodiment, a DC input module switch is formed by four semiconductor switching devices shown as field effect transistors (FETs) Q6, Q7, Q8, Q9. All of the FETs Q6, Q7, Q8, Q9 in this embodiment must be switched on before the input voltage is provided to the output line 790 (shown as pin 16 on connector 702).

Also shown is a differential sense amplifier 704 that, in several embodiments, provides a ground referenced 0 to +5 V output 706 for a 0 to +72 V input.

When the DC input module 700 is on-line, opto-coupler U3 provides an inhibit signal on inhibit output lines 745 that is output on pins 3 and 4 of the connector 702. In several embodiments, the connector 702 couples with a computer backplane, e.g., computer backplane 112, and the inhibit signal from pins 3 and 4 is fed via the computer backplane to an inhibit input line of another input module to lock out the other input module. In several embodiments, the other input module may be the DC input module 700 or another type input module, e.g., an AC input module of a type discussed further herein with reference to FIG. 8.

When the DC input module 700 is off-line, an inhibit signal received from the other input module at inhibit input lines 782 (shown as pins 1 and 2 of the connector 702) will prevent the FETs Q6, Q7, Q8, Q9 from turning on, therefore, preventing the DC input module 700 from providing power to output line 790 (i.e., locking out the DC input module 700).

It should be recognized that the DC input module 700 in several embodiments will interoperate with other DC input modules so that inhibit signals provided at the inhibit lines 745 will lock out the other input module, and inhibit signals received at inhibit input lines 782 from the other input module will lock out the DC input module 700.

Figure 8A:
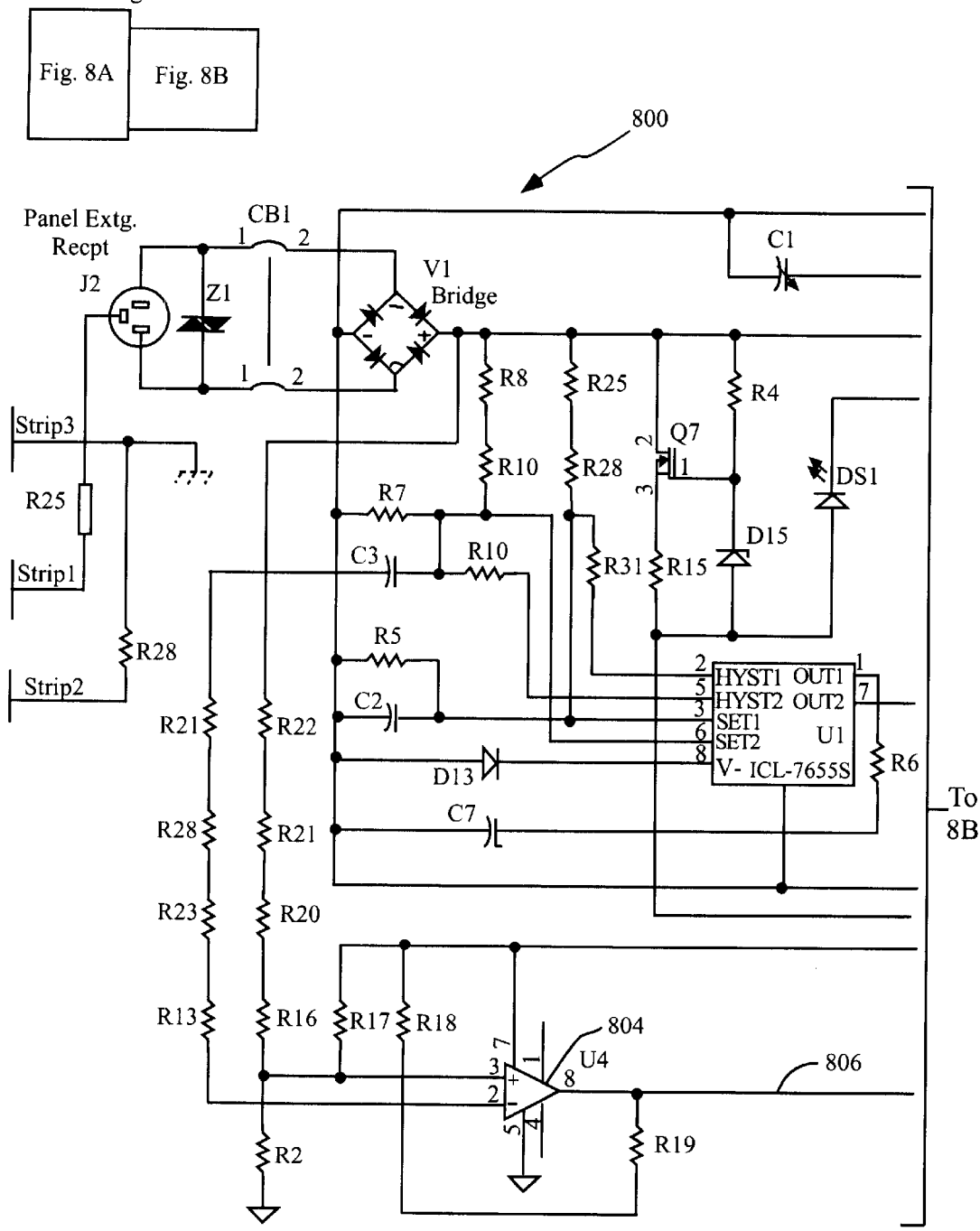
Figure 8B:
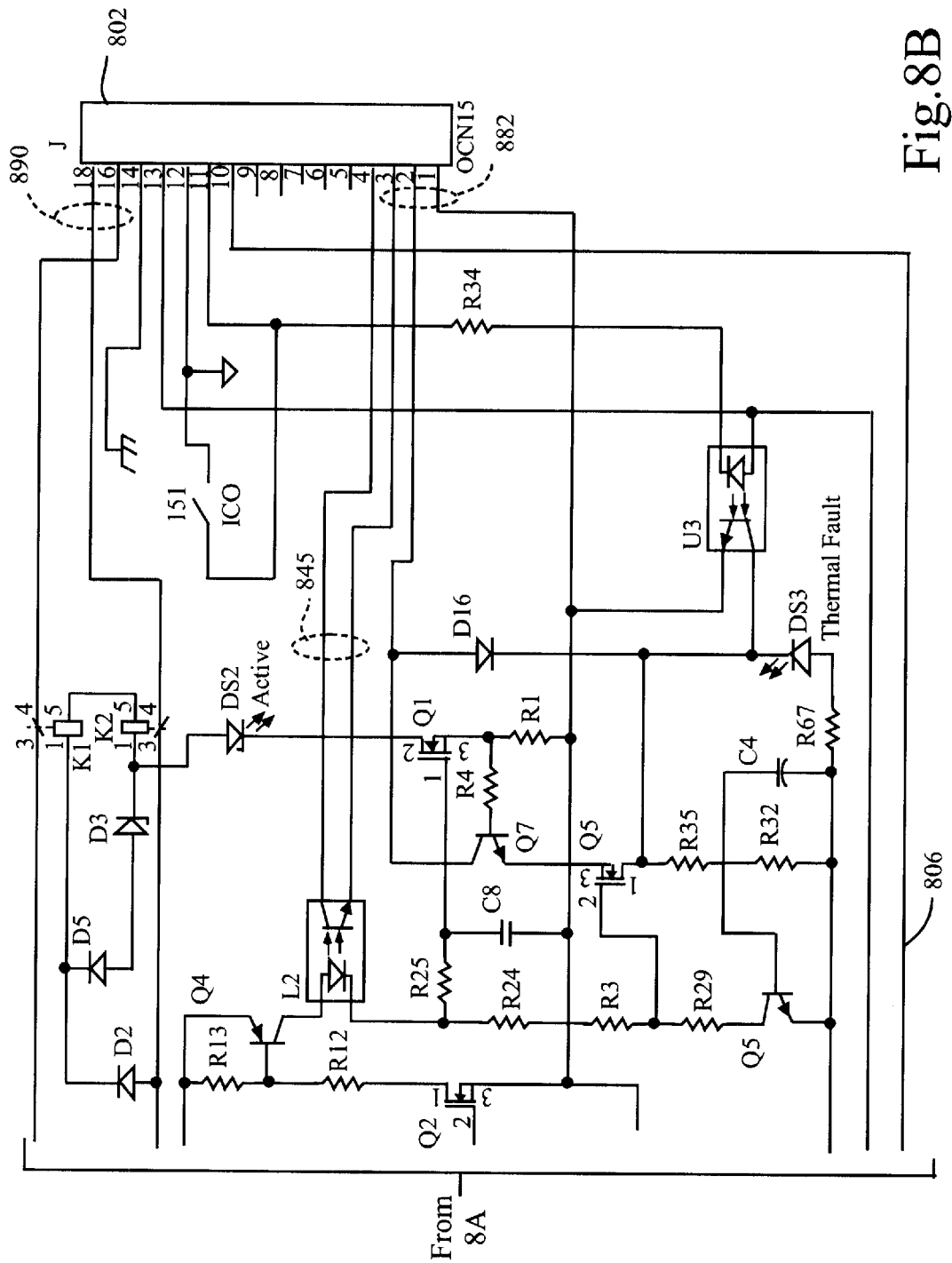

FIG. 8 is a schematic diagram of the hardware making up one embodiment an input module of FIGS. 1, 2 and 3 that accepts alternating current.

Shown is an AC input module 800 that is configured to accept AC voltages from 90 to 265 VAC and DC voltages from 90 to 144 VDC. Additionally, the AC input module 800 provides an output voltage at line 890 that is between 90 and 265 VDC.

Also shown is a differential sense amplifier 804 that provides a ground referenced 0 to +5 V output 806 for a 0 to 72 V input.

In this embodiment, an AC input module switch is formed by a double pole relay shown as K1 and K2. The coils of the double pole relay must be energized to close the double pole relay switch before the AC input module 800 will provide the output voltage at output lines 890 (shown as pins 15 and 16 on connector 802).

When the AC input module 800 is on-line, opto-coupler U2 provides an inhibit signal on inhibit output lines 845 (shown as pins 3 and 4 of the connector 802). In several embodiments, the connector 802 couples with a computer backplane, e.g., computer backplane 112, and the inhibit signal from pins 3 and 4 is fed via the computer backplane to an inhibit signal inhibit line of another input module to lock out the other input module.

When the AC input module 800 is off-line, an inhibit signal received from the other input module at inhibit input lines 882 (shown as pins 1 and 2 of the connector 802) will prevent the coils of the relays K1 and K2 from energizing (by preventing FET Q1 from turning on), therefore, preventing the AC input module 800 from providing power to the output line 890 (i.e., locking out the AC input module 800).

As with the DC input module, the AC input module 800 in several embodiments will interoperate with other AC input modules to both lock out another input module (when the AC input module 800 is on-line) and be locked out by the other input module when the other input module is on-line.

While the invention herein disclosed has been described by means of specific embodiments and applications thereof, numerous modifications and variations could be made thereto by those skilled in the art without departing from the scope of the invention set forth in the claims.

What is claimed is:

1. A power input architecture for a computing system comprising:
    a first input module comprising a second input module inhibitor and a first input module switch wherein the first input module is configured to receive power from a first power source wherein the first input module switch detachably couples the first input module to a power supply system for the computing system; and
    a second input module comprising a first input module inhibitor and a second input module switch wherein the second input module is configured to receive power from a second power source wherein the second input module switch detachably couples the second input module to the power supply system for the computing system;
    wherein the first and second power input modules and the power supply system for the computing system are configured to be housed in a chassis of the computing system;
    wherein the second input module inhibitor is coupled to the second input module switch and is configured to provide a second input module inhibit signal wherein the second input module switch is configured to open in response to the second input module inhibit signal.

2. The power input architecture of claim 1 wherein the power supply system comprises N+1 power supplies wherein N power supplies provide operating power to the computing system wherein both the first and second power input modules individually provide sufficient power to power the N+1 power supplies.

3. The power input architecture of claim 1 wherein the chassis is a single chassis that houses the first input module, the second input module and the power supply system.

4. The power input architecture of claim 1 wherein the first input module and the second input module are hot swappable.

5. The power input architecture of claim 1 wherein the second input module further includes:
    a second input module voltage detector configured for receiving a first rectified voltage and outputting a first voltage confirmation signal in response to the first rectified voltage being within a predetermined voltage window;
    a second input module switch actuator coupled with the second input module voltage detector;
    wherein the second input module switch actuator communicatively couples the second input module inhibitor with the second input module switch and the second input module switch actuator opens the second input module switch in response to receiving the second voltage confirmation signal and the second input module inhibit signal.

6. The power input architecture of claim 5 wherein the second input module switch actuator closes the second input module switch when, in the absence of the second input module inhibit signal, the second input module switch actuator receives the second voltage confirmation signal.

7. The power input architecture of claim 1 wherein the first input module is a default input module by virtue of being within a particular receiving slot.

8. A method of providing input power to a computing system comprising the steps of:
    receiving a first voltage from a first power source at a first input module wherein the first input module is detachably coupled to the computing system;
    communicating an inhibit signal from the first input module to a second input module in response to the first voltage from the first power source being at least a first predetermined voltage level;
    receiving a second voltage from a second power source at the second input module wherein the second input module is detachably coupled to the computing system;
    isolating the second voltage received at the second input module from the power supply system in response to the inhibit signal from the first input module being received at the second input module;
    providing power from the first power source to a power supply system for the computing system through the first input module in response to the first voltage from the first power source being at least the first predetermined voltage level; and
    providing power from the second power source to the power supply system for the computing system through the second input module in response to both the inhibit signal from the first input module not being received at the second input module and the second voltage being at least a second predetermined voltage level.

9. The method of claim 8 wherein the step of providing power from the first power source comprises, in response to the first input module being within a default input module slot, providing power to the power supply system through the first input module regardless of the second voltage being at least the predetermined voltage level when the first voltage from the first power source is at least the predetermined voltage level.

10. The method of claim 8 wherein the communicating the inhibit signal comprises communicating the inhibit signal with an opto-coupler.

11. The method of claim 8 further comprising removing the inhibit signal from the first input module to the second input module in response to the first input module being decoupled from the computing system.

12. The method of claim 8 further comprising the step of isolating the first voltage from the power supply system in response to the first voltage being less than the first predetermined voltage level.

13. The method of claim 8 further comprising coupling the first and second input modules to the computing system with a support structure wherein the first and second input modules are detachably coupled to a computer backplane of the computing system.

14. The method of claim 8 wherein isolating the second voltage comprises isolating the second voltage by opening a second input module switch in response to the inhibit signal from the first input module being received at the second input module while the second voltage is at least the second predetermined voltage level.

15. An input module system for providing input power to a computing system comprising:

means for receiving a first voltage from a first power source at a first input module wherein the first input module is detachably coupled to the computing system;

means for communicating an inhibit signal from the first input module to a second input module in response to the first voltage from the first power source being at least a first predetermined voltage level;

means for receiving a second voltage from a second power source at the second input module wherein the second input module is detachably coupled to the computing system;

means for isolating the second voltage received at the second input module from the power supply system in response to the inhibit signal from the first input module being received at the second input module;

means for providing power from the first power source to a power supply system for the computing system through the first input module in response to the first voltage from the first power source being at least the first predetermined voltage level; and means for providing power from the second power source to the power supply system for the computing system through the second input module in response to both the inhibit signal from the first input module not being received at the second input module and the second voltage being at least a second predetermined voltage level.

16. The input module system of claim 15 wherein the means for providing power from the first power source comprises, in response to the first input module being within a default input module slot, means for providing power to the power supply system through the first input module regardless of the second voltage being at least the predetermined voltage level when the first voltage from the first power source is at least the predetermined voltage level.

17. The input module system of claim 15 wherein the means for communicating the inhibit signal comprises means for communicating the inhibit signal with an optocoupler.

18. The input module system of claim 15 further comprising means for removing the inhibit signal from the first input module to the second input module in response to the first input module being decoupled from the computing system.

19. The input module system of claim 15 further comprising means for isolating the first voltage from the power supply system in response to the first voltage being less than the first predetermined voltage level.

20. The input module system of claim 15 further comprising means for coupling the first and second input modules to the computing system with a canister wherein the first and second input modules are detachably coupled to the canister and the canister is coupled with a rack that supports the computing system.

* * * * *

UNITED STATES PATENT AND TRADEMARK OFFICE
CERTIFICATE OF CORRECTION

PATENT NO. : 6,639,329 B2
DATED : October 28, 2003
INVENTOR(S) : Johni Chan et al.

It is certified that error appears in the above-identified patent and that said Letters Patent is hereby corrected as shown below:

<u>Title page,</u>
Item [75], Inventors, change "Ranco" to -- Rancho --

Signed and Sealed this

Twenty-third Day of March, 2004

JON W. DUDAS
*Acting Director of the United States Patent and Trademark Office*